United States Patent [19]
Pain et al.

[11] 3,967,942
[45] July 6, 1976

[54] PURIFYING APPARATUS

[75] Inventors: Barrie Reginald Kirby Pain, Oxford, England; Gunnar Robert Wilhelmsson, Vaxjo, Sweden

[73] Assignee: Aktiebolaget Svenska Flaktfabriken, Sweden

[22] Filed: Dec. 23, 1974

[21] Appl. No.: 535,161

Related U.S. Application Data

[63] Continuation-in-part of Ser. No. 329,951, Feb. 2, 1973, abandoned.

[30] Foreign Application Priority Data
Feb. 2, 1972  United Kingdom................. 4922/72

[52] U.S. Cl.............................. 55/223; 55/257 QV; 55/431; 98/115 SB; 118/DIG. 7; 261/111; 261/DIG. 44
[51] Int. Cl.²........................................ B01D 47/06
[58] Field of Search............. 55/223, 226, 240, 241, 55/242, 257, 431; 261/108, 109, 116, 118, 126, DIG. 44, DIG. 54, 111; 98/115 SB; 118/326, 634, DIG. 7

[56] References Cited
UNITED STATES PATENTS

| | | |
|---|---|---|
| 1,966,280 | 7/1934 | Bingman........................ 261/116 X |
| 2,383,138 | 8/1945 | Ludwig, Sr....................... 55/257 X |
| 3,119,675 | 1/1964 | Callagher.......................... 55/223 X |
| 3,168,030 | 2/1965 | Wilhelmsson et al........... 98/115 SB |
| 3,225,522 | 12/1965 | Black............................. 55/257 X |
| 3,233,881 | 2/1966 | Smith............................. 261/116 X |
| 3,391,630 | 7/1968 | Wilhelmsson................... 98/115 SB |
| 3,561,135 | 2/1971 | Fulford.............................. 118/326 |

*Primary Examiner*—Frank W. Lutter
*Assistant Examiner*—David L. Lacey
*Attorney, Agent, or Firm*—Edward H. Loveman

[57] ABSTRACT

Apparatus for purifying the air laden with paint particles for use in a paint spray booth, comprises a vertical duct having a mixing chamber at one end. The chamber has a horizontal wall formed with one or more straight or curved slots at which a spray or washing liquid and the air stream are directed to atomize the washing liquid. An upright guide structure in the mixing chamber defines a narrow passage or passages in which the impurities are removed from the air stream by the atomized liquid.

11 Claims, 9 Drawing Figures

PURIFYING APPARATUS

This application is a continuation-in-part of patent application Ser. No. 328,951, filed Feb. 2, 1973, and entitled "Purify Apparatus" now abandoned.

This invention relates to apparatus for removing impurities such as paint and varnish droplets, cellulose particles, and the like from an air stream in a paint spraying booth.

In known apparatus for collecting contaminants or impurities from gases such as air, it has been known to employ streams of water directed at passages through which the contaminated air flows. Such prior apparatus depended on creating turbulence in the mixture of air and water for entraining particles entrained in the air stream. Typical apparatus of this prior art type is described in such U.S. patents as U.S. Pat. No. 3,119,675, issued to E. F. Gallagher on Jan. 28, 1964; U.S. Pat. No. 3,225,522, issued to B. Black on Dec. 28, 1965; and U.S. Pat. No. 3,233,881, issued to F. S. Smith on Feb. 8, 1966. These prior apparatus have not proven wholly satisfactory because the stream of water projected into the air streams was not sufficiently atomized by the nozzles used to project the wash water and insufficient impurities were entrained therein.

Applicants have discovered that it is possible to increase the quantity of airbourne impurities entrained by a washing liquid which may be water by providing means for further atomizing a fine water spray projected into an air stream laden with particulate impurities. This is done by employing a narrow aperture or slot in a plate to obtain a venturi effect. At the narrow slot the fine water spray is further atomized by the air stream drawn through the slot by suction. Effective mixture of the atomized liquid with the impurities in the air stream occurs at the slot and continues in a narrow passage provided in a mixing chamber downstream of the slot. The slot mat be straight or annular. A plurality of narrow, straight or annular slots may be provided to increase the volume of air cleaned by the apparatus. Where two straight slots are used separate passages may be provided for each slot. The mixing chamber is located at the bottom end of a vertical duct and is provided with staggered baffles to define a tortuous path for air passing through the duct. Further means are provided for spraying washing liquid on the inside walls of the duct and on the baffles. Washing liquid containing the collected impurities drains down into a trough from which a cascade falls into a drain basin. The contaminated air may be drawn through the liquid cascade prior to entering the mixing chamber for initial screening or filtering out of large particles of impurities in the air stream. The washing liquid may be water alone or may contain a detergent, and if desired, a surface tension reducing agent to facilitate the mixture of paint droplets with the washing liquid.

It is therefore a principal object of the present invention to provide improved air purifying or washing apparatus in which there is a narrow passage located adjacent the bottom of a duct for exhausting the air, the passage having a restricted inlet in the form of a narrow slot with closely spaced edges at which washing liquid from a jet or spray upstream of the slot is atomized and intimately mixed in the passage, the air stream itself serving to atomize the liquid spray in coaction with the edges of the slot.

A further object of the present invention is to provide apparatus as described, wherein the slot may be straight or annular.

Another object of the present invention is to provide a plurality of straight or annular slots to increase the volume of air purified by the apparatus.

These and other objects and many of the attendant advantages of this invention will be readily appreciated as the same becomes better understood by reference to the following detailed description when considered in connection with the accompanying drawings in which.

Figure 1:
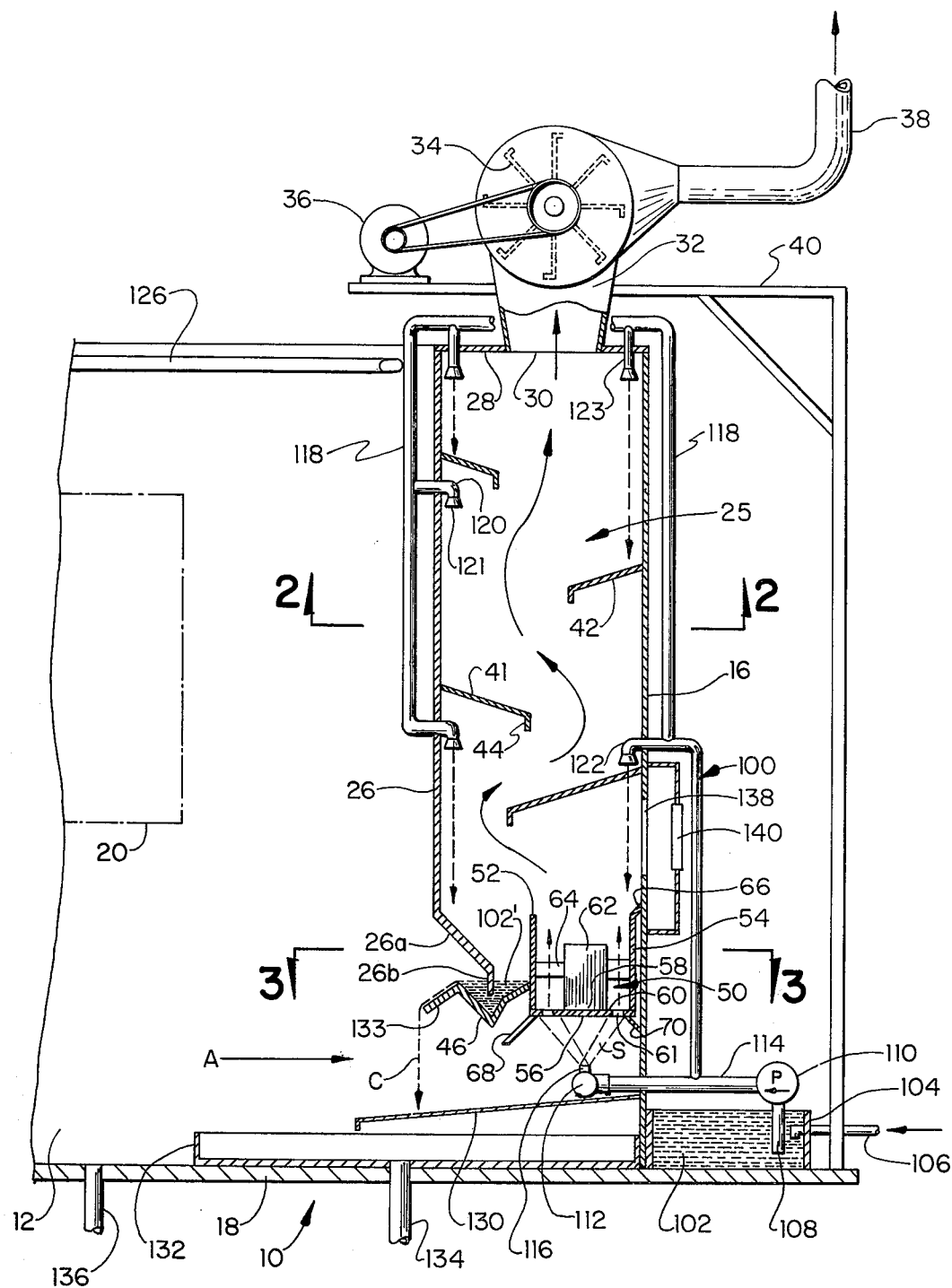
FIG. 1 is a vertical sectional view through a paint booth containing apparatus embodying the invention.
Figure 2:
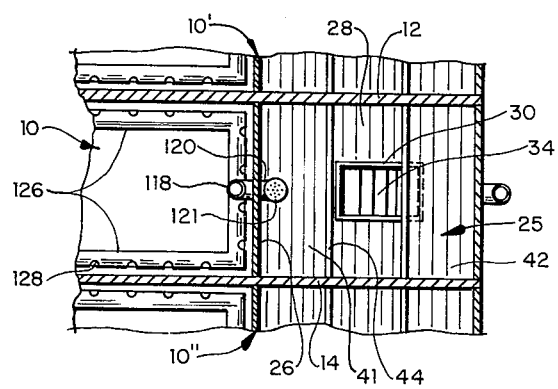
FIG. 2 is a fragmentary horizontal sectional view taken along line 2—2 of FIG. 1.
Figure 3:
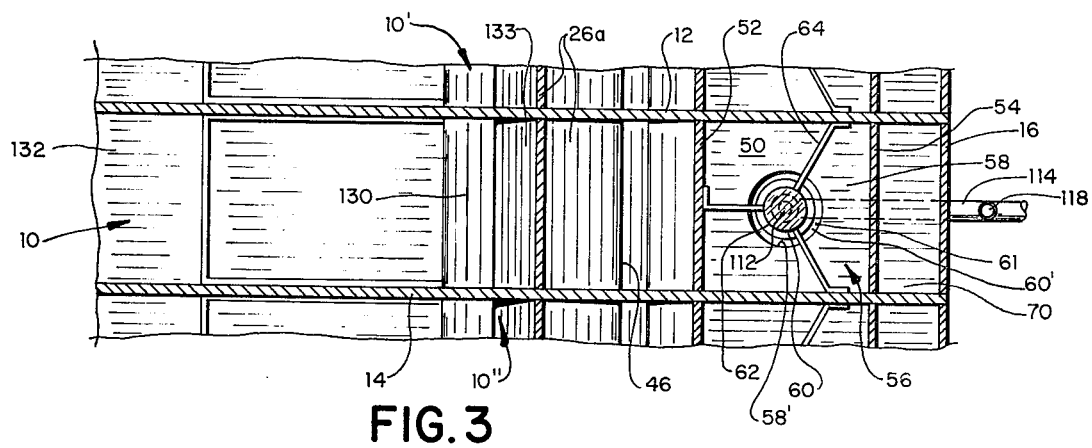
FIG. 3 is a fragmentary horizontal sectional view on an enlarged scale taken along line 3—3 of FIG. 1.

Referring now to the drawings wherein like reference characters designate like or corresponding parts throughout, there is illustrated in FIGS. 1, 2 and 3, a rectangular spray booth generally designated by reference numeral 10 having a pair of spaced side walls 12 and 14, a rear wall 16, and a bottom wall or floor 18. The top and front end of the booth 10 may be open for inserting and suspending an article or a body 20 to be spray painted.

At the rear of the booth is a duct 25 in which paint laden air is cleaned. The duct 25 is defined by the side walls 12 and 14 of the spray booth 10, the rear wall 16 and a forward vertical wall 26 which extends between and is joined to the side walls 12, 14. The duct 25 has a top wall 28 in which is an opening 30. Connected to the top wall 28 is a duct 32 which leads to a suction fan 34 driven by a motor 36. The fan draws air from the duct 25 and discharges it through an exhaust pipe 38. The fan 34 is supported by a rack 40.

Inside of the duct 25 is a plurality of spaced, staggered downwardly and inwardly inclined baffles 41, 42 joined at their respective lateral ends to the side walls 12, 14. The baffles 41 are joined at their forward ends to the wall 26 and extend rearwardly while the baffles 42 are joined at their rear ends to the wall 16 and extend forwardly. Each of the baffles 41 and 42 is a flat plate with a depending flat flange 44 extending the full lateral width of the duct 25.

The wall 26 has a downwardly and inwardly inclined wall section 26a and a depending flange 26b disposed above a V-shaped trough 46 with the ends thereof joined to the side walls 12, 14. Adjacent the trough 46 is a mixing chamber 50 which has two vertical, spaced walls 52, 54 secured to the lateral walls 12, 14 of the booth 10. The chamber 50 has a bottom wall 56 defined by a plurality of flat coplanar plates 58 and 60. The plate 58 is joined to the walls 12, 14 of the booth 10 and to the lower ends of the walls 52, 54. The plate 60 is joined to a cylindrical guide member 62 closed at the top and supported by three radiating arms 64 connected to the walls 12, 14 and 52 as best shown in FIG. 3. A narrow annular slot 61 is defined between the spaced edges 58' and 60' of the respective plates 58, 60. The trough 46 is sealed at its rear edge to the wall 52. A flange 66 closes the space between the chamber wall 54 and the rear wall 16. Two flat flanges 68 and 70 are secured to the bottom wall 56 and flare outwardly and downwardly for guiding paint laden air into the mixing chamber 50, through the slot 61. From an inspection of the drawing it will be apparent that air is drawn by the suction fan 34 from the inside of the booth 10 in the direction of arrow A and via the guide flanges 68, 70 through the slot 61 upwardly around the cylindrical member 62 and through the duct 25.

A system of piping 100 is provided for conveying a washing liquid 102 which may be contained in a basin 104 located at the rear of the booth 10. The basin 104 is kept filled with the washing liquid 102 via a supply pipe 106. The washing liquid 102 is drawn from the basin 104 by a pipe 108 connected to a motor driven pump 110. A nozzle 112 is connected to the pump 110 via a pipe 114. The nozzle 112 is located below the bottom wall 56 of the mixing chamber 50, and is located axially below the cylindrical member 62. The nozzle 112 is provided with a fitting 116 for projecting a conical stream or sprays of the washing liquid 102 upwardly to the annular slot 61.

A pipe 118 is coupled to the pipe 114 and has a plurality of outlets 120, 122, and 123 extending into the duct 25 through the respective walls 26, 16 and 28 for washing the inner sides of these walls and the upper sides of the baffle plates 41 and 42. A branch pipe 126 (FIG. 2) extends along the sides of the walls 12, 14 of the booth 10 and is provided with a plurality of lateral openings 128 for washing these walls. The pipes 120 and 122 have a spray head 121 to distribute the washing liquid 102 over the baffles and walls of the duct. Located below the duct 25 is an inclined drain plate 130 which has a forward end disposed above a catch basin 132 which has a drain 134. The drain plate 130 is located below a guide plate 133 secured to the forward edge of the trough 46. Normally the trough 46 is filled with a liquid 102' containing paint drops. The liquid 102' drains down to the plate 130 and defines a curtain or cascade C of washing liquid through which the paint laden air stream is drawn by the fan 34. A further drain 136 is provided in the floor 18 of the booth 10. A port 138 is provided in the wall 16 of the bottom of the booth 10, to provide access into the duct 25 for cleaning and servicing. This is closed by a removable access door 140.

In operation of the apparatus a jet of water or washing liquid 102 emerges as conical sprays from the nozzle 112 and impinges on the bottom wall 56 of the mixing chamber 50. The paint laden air is simultaneously drawn up into the annular mixing chamber 50 via the annular slot 61. The conical sprays define a cone whose maximum diameter just exceeds the maximum diameter of the slot 61. The paint laden air and wash water pass concurrently through the slot 61. The closely spaced edges 58' and 60' of the bottom wall atomize the washing liquid 102. Thorough mixing of the atomized liquid and paint drops and vapors takes place in the annular chamber 50 due to a venturi-like effect occuring at the slot 61 which is so narrow that no liquid 102 may pass therethrough in counter-current flow. The atomized water takes the paint laden air and passes upwardly in the duct 50. The alternate inclined baffle plates 41, 42 have a restraining effect on the paint laden atomized liquid which drains down into the trough 46. The inner sides of the duct 25 and the baffles 41 and 42 are continuously flooded with the washing liquid 102 supplied via the pipes 120, 122. This washing liquid also drains down into the trough 46 and then falls in a cascade into the catch basin 132. While falling, the cascade C filters the paint laden air stream as abovementioned. The cleaned air passes up the duct 25, and out to the exhaust pipe 38 via the duct 32 and the fan 34.

It will be apparent that more than one booth, each having a cleaning apparatus as described may be provided. Parts of adjacent booths 10' and 10'' are shown in FIGS. 2 and 3. By making use of the common side walls 12, 14, three, four or more paint spray booths may be assembled to occupy minimum space and effect economies in construction.

Figure 4:
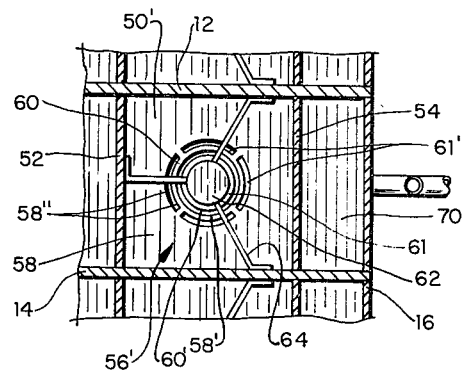
FIG. 4 is a fragmentary horizontal sectional view similar to a portion of FIG. 3 illustrating a modification of the invention.

FIG. 4, illustrates an alternate structure for the bottom wall 56' of the mixing chamber 50'. Here there are a plurality of annular or arcuate slots 61 and 61' in a wall 56' concentric with each other and with the cylindrical guide member 62. This construction may be used to facilitate cleaning larger quantities of paint laden air and to provide more plate edges 58'' at the respective slots 61' for atomizing more washing liquid.

Figure 5:
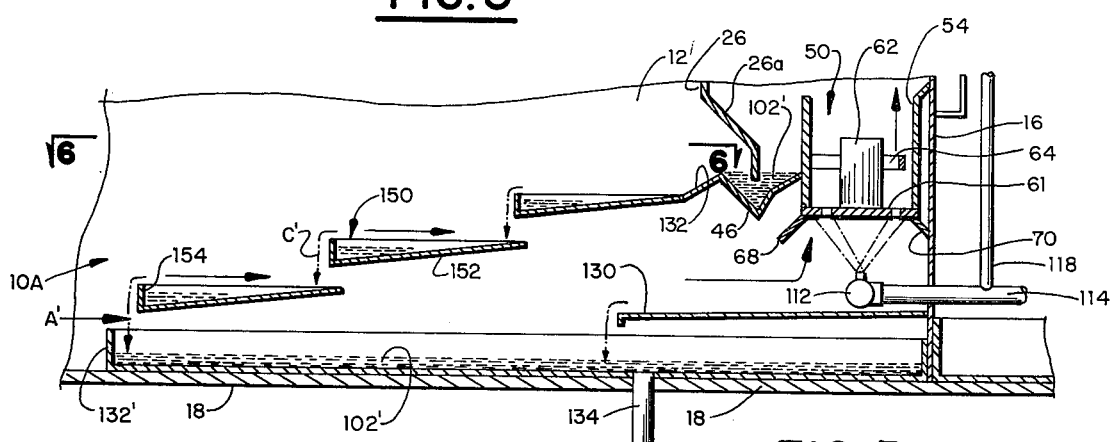
FIG. 5 is a vertical sectional view similar to a portion of FIG. 1, showing another embodiment of the invention.
Figure 6:
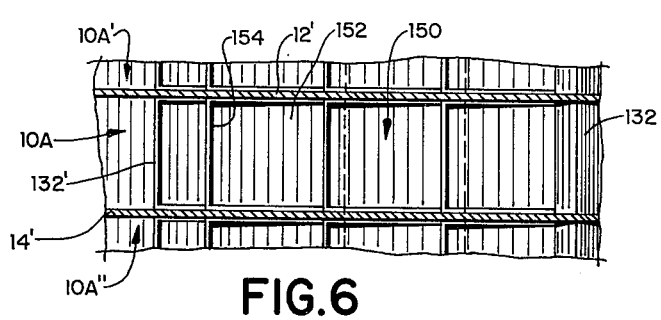
FIG. 6 is a fragmentary horizontal sectional view taken along line 6—6 of FIG. 5.

FIGS. 5 and 6 show another booth 10A in which a plurality of overlapped spaced pans 150 each having an inclined bottom 152 are provided in a step-wise array downward from the trough 46. The pans 150 have vertical forward walls 154. The pans are secured between the side walls 12' and 14' of the booth 10A. A plurality of cascases C' in succession are provided forwardly of the trough 46 and above a basin 132', which define a plurality of liquid curtains through which the paint laden air streams A' pass. The basin 132' collects the liquid 102'. Further lateral booths 10A' and 10A'' may be provided as indicated in FIG. 6.

Figure 7:
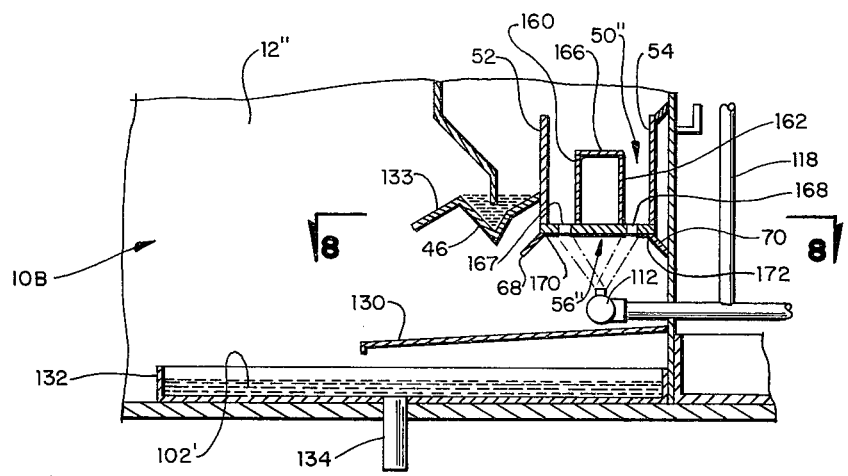
FIG. 7 is a vertical sectional view similar to a portion of FIG. 1, showing a further embodiment of the invention.
Figure 8:
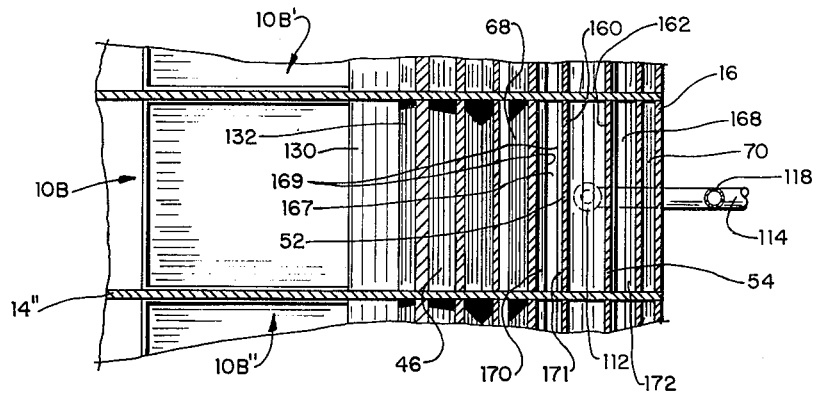
FIG. 8 is a fragmentary horizontal sectional view of an enlarged scale taken along line 8—8 of FIG. 7.

FIGS. 7 and 8 show another booth 10B in which another mixing chamber 50'' is defined between a pair of flat vertical plates 160, 162 joined to side walls 12'', 14'' of the booth 10B and closed by a top plate 166. A bottom wall 56'' has two straight narrow slots 167 and 168 defined between a spaced edge 169 of each respective plate 170, 171 and 172 which constitute the bottom wall 56''. The plates 160, 162 and 166 constitute a rectangular guide structure for dividing the atomized liquid into two sheet-like streams as contrasted with the single cylindrical stream passing through the annular slot 61 of the booth 10 or the multiple concentric streams passing through the annular slots 61, 61' illustrated in FIG. 4. Further, the lateral booths 10B', 10B'' may be provided as shown in FIG. 8.

Figure 9:
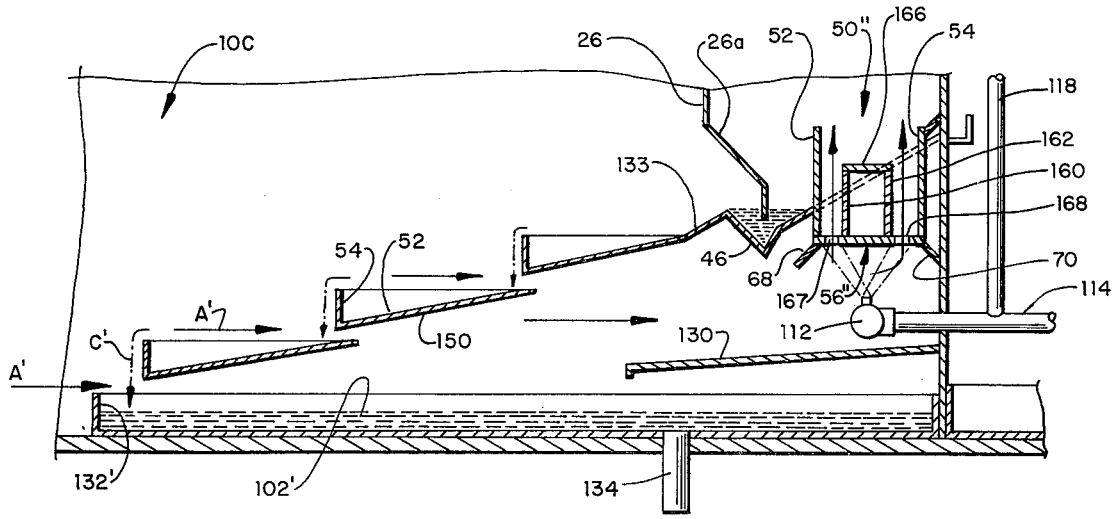
FIG. 9 is a vertical sectional view similar to portions of FIGS. 1, 5, 7 showing still another embodiment of the invention.

FIG. 9, shows a booth 10C provided with the same rectangular mixing chamber 50'' as in the booth 10B. The stepped pans 150 are provided as in the booth 10A. Thus the booth 10C provides the advantages of the multiple liquid cascades C' for initially cleaning and filtering paint drops from the incoming air stream A' and in addition provides the advantages derived from the straight narrow slots 167, 168 in the bottom wall 56'' of the mixing chamber.

All forms of the invention described are characterized by the use of air and liquid mixing chambers in which the liquid is atomized in narrow slots located at the bottom walls of the mixing chamber. Preferably, the cross-sectional area of the mixing chamber should be substantially greater than that of the slot or slots.

It should be understood that the foregoing relates to only a limited number of preferred embodiments of the invention, which have been by way of example only and that it is intended to cover all changes and modifications of the examples of the invention herein chosen for the purposes of the disclosure, which do not constitute departures from the spirit and scope of the invention.

The invention claimed is:

1. Apparatus for purifying an air stream laden with impurities, comprising:
    a vertical duct having opposed spaced walls;
    baffle means extending alternately from opposite ones of said walls to define a tortuous path for an air stream free of said impurities passing through said duct;
    outlet means connected to the upper end of said duct;
    suction means communicating with said outlet means for drawing said air stream through said tortuous path;
    inlet means connected to the lower end of said duct, said inlet means comprising:
    vertical plate means supported in said duct;
    a horizontal bottom wall joined in part to said vertical plate means and having at least one slot therein with closely spaced edges for receiving said stream of air laden with impurities;
    an upright guide structure extending from said bottom wall toward said outlet means and spaced between said plate means adjacent said slot, to define a narrow passage leading to said tortuous path; and
    spray means below said bottom wall for directing a conical spray of a washing liquid against the underside of said bottom wall toward said slot as a cone whose maximum diameter just exceeds the extent of said slot whereby said washing liquid is distributed into fine drops by the edges of said slot so that said fine drops of liquid and said air laden with said impurities are mixed intimately to entrain said impurities in said drops.

2. Apparatus as defined in claim 1, wherein said slot in said bottom wall of said mixing chamber is annular in form, and wherein said upright structure is cylindrical in shape, concentric with said slot and slightly smaller in diameter than said slot, so that the mixture of atomized liquid and air laden with impurities forms a narrow cylindrically shaped stream in passing through said passage.

3. Apparatus as defined in claim 2, wherein said spray means comprises a nozzle shaped to form a conical spray impinging against edges of said slot.

4. Apparatus as defined in claim 2, wherein said bottom wall is formed with another annular slot concentric with said first named slot so that the mixture of atomized liquid and air laden with impurities forms a plurality of concentric cylindrically shaped streams in passing through said passage.

5. Apparatus as defined in claim 1, wherein said slot is straight and wherein said upright structure has a flat side adjacent said slot, so that the mixture of atomized liquid and air laden with impurities forms a flat, narrow stream in passing through said passage.

6. Apparatus as defined in claim 5, wherein said bottom wall is formed with another straight slot spaced laterally from said first named slot, and wherein said upright structure has another flat side spaced from said first named flat side and disposed adjacent to said other straight slot, so that the mixture of atomized liquid and air laden with impurities forms two flat, narrow streams in passing through both of said slots and said passage.

7. Apparatus as defined in claim 1 further including collection means below said duct for collecting washing liquid containing the impurities removed from said stream of air laden with impurities.

8. Apparatus as defined in claim 7, wherein said collection means comprises a trough positioned adjacent said mixing chamber, and a basin below said trough disposed so that the washing liquid overflowing said trough falls as a cascade into said basin, whereby said air stream laden with impurities passing to said mixing chamber first passes through said cascade and is initially filtered by said cascade.

9. Apparatus as defined in claim 7, wherein said collection means comprises:
    a trough positioned adjacent said mixing chamber;
    a pan joined to said trough disposed so that washing liquid overflowing said trough fills and overflows said pan; and
    a basin below said pan disposed so that washing liquid overflowing said pan falls as a cascade into said basin, whereby said air stream laden with impurities passing into said mixing chamber first passes through said liquid cascade and is initially filtered by said cascade.

10. Apparatus as defined in claim 7, wherein said collection means comprises:
    a trough positioned adjacent said mixing chamber;
    a plurality of pans disposed in a vertically spaced stepped array with respect to said trough; and
    a basin below said pans, so disposed that washing liquid overflowing said trough passes in succession to said pans and said basin and forms a plurality of liquid of cascases between said pans and said basin, whereby said air stream laden with impurities passing into said mixing chamber first passes through said liquid cascades and is initially filtered thereby.

11. Apparatus as defined in claim 1, further comprising pipe means and spray heads arranged to distribute said washing liquid on inner sides of said walls of said duct and on said baffles for washing the same.

* * * * *